United States Patent [19]

Maletta

[11] Patent Number: 4,973,944

[45] Date of Patent: Nov. 27, 1990

[54] ELECTRICAL SIGNAL AND ALARM PROTECTION PROXIMITY DEVICE

[76] Inventor: Gabriel J. Maletta, 55A Traction Blvd., Patchogue, N.Y. 11772

[21] Appl. No.: 354,898

[22] Filed: May 19, 1989

[51] Int. Cl.[5] .............................................. G08B 13/14
[52] U.S. Cl. ................................... 340/568; 340/539; 340/573; 340/693
[58] Field of Search .................... 340/568, /572, /573, 340/539, 693, 652; 248/114, 115, 116; 224/219

[56] References Cited

U.S. PATENT DOCUMENTS

| | | | |
|---|---|---|---|
| 4,157,540 | 6/1979 | Oros | 340/573 |
| 4,665,389 | 5/1987 | Clendening | 340/693 |
| 4,736,196 | 4/1988 | McMahon et al. | 340/573 |
| 4,777,477 | 10/1988 | Watson | 340/573 |

Primary Examiner—Glen R. Swann, III
Assistant Examiner—Geoff Sutcliffe
Attorney, Agent, or Firm—Richard L. Miller

[57] ABSTRACT

An electronic signal and alarm protection proximity device is disclosed which may be strapped by a band assembly to a person's appendage or a permanent part of a piece of equipment. The instant invention transmits a signature encoded RF signal distinguishable from others to be monitored by an appropriate receiving station. When the device is taken out of range of the station or the band is severed the design is such that the signal at the receiving station is no longer received and an indication is thus had that the person or the equipment to which the device is or was secured may be leaving the allowed range of proximity and thus a search or other measures may be immediately initiated.

9 Claims, 1 Drawing Sheet

ELECTRICAL SIGNAL AND ALARM PROTECTION PROXIMITY DEVICE

BACKGROUND OF THE INVENTION

The instant invention relates generally to high technology warning devices, and more particularly to an electronic signal and alarm protection proximity device.

Numerous technology warning devices have been provided in the prior art that are adapted to specific various special purposes. While these units may be suitable for the particular purpose to which they address, they would not be as suitable for the purpose of the present invention as hereafter described.

SUMMARY OF THE INVENTION

A primary object of the present invention is to provide an electronic signal and alarm protection device that will overcome the shortcomings of the prior art devices.

Another object is to provide an electronic signal and alarm protection device that will provide a secure means to monitor the proximity of persons wearing a transmitter/band component of the instant invention. This can be extremely usefull for infants and mental patients in hospital settings, the aged in nursing homes, or for convicted felons in and out of prison confinement programs.

An additional object is to provide an electronic signal and alarm protection device that will provide a secure means to monitor the proximity of equipment such as, typewriters, cameras, machine tools, etcetera on which a transmitter/band component of the instant invention is installed.

A further object is to provide an electronic signal and alarm protection device that is simple and easy to use.

A still further object is to provide an electronic signal and alarm protection device that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows.

DETAILED DESCRIPTION OF THE PREFERRED EMBODIMENTS

Figure 1:
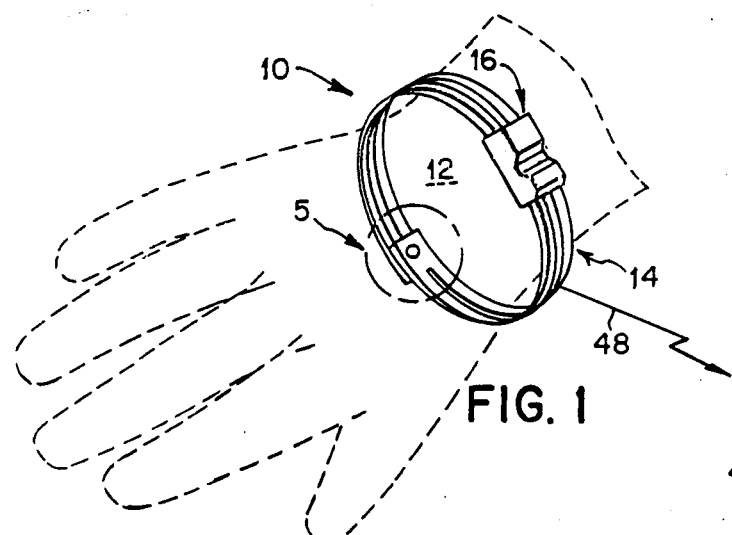
FIG. 1 is a perspective view of the instant invention worn on the wrist of a person typically an infant.

Turning now descriptively to the drawings, in which like reference characters denote like elements throughout the several views, FIG. 1 illustrates the instant invention 10 installed around the wrist 12 of a person typically but not necessarily an infant. The instant invention 10 consists primarily of two major components, a band assembly 14, and a transmitter component 16.

Figure 6:
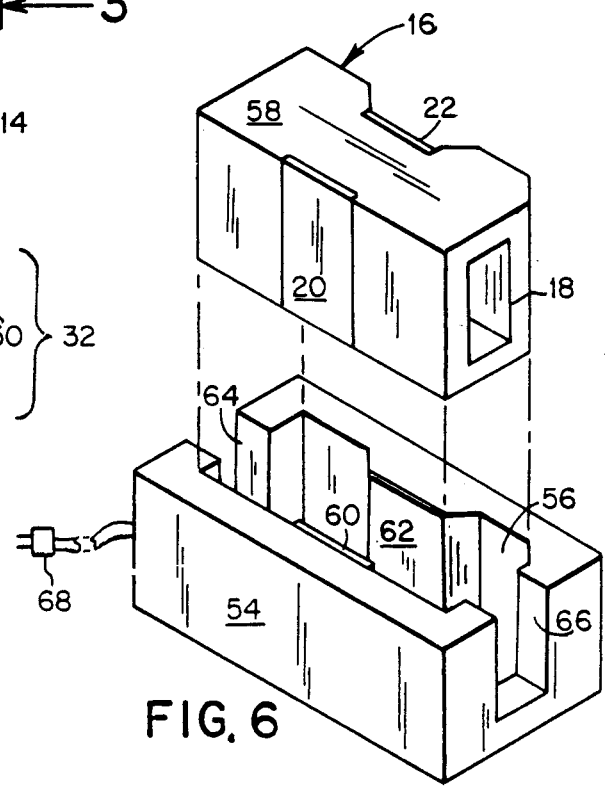
FIG. 6 is a perspective view of a battery charger with a transmitter ready to be inserted therein to be recharged.

As best seen in FIG. 6 the transmitter component 16 is typically housed in a case 58 fabricated out of a one piece molded plastic part. A rectangular cavity 18 extends transversely through the entire transmitter component 16 from end to end.

In addition to the transmitter component 16, containing RF circuitry 24, a self contained, typically but not necessarily, lithium battery 26 is also housed within this component in order to supply the necessary source of power to operate this RF circuitry 24. A first pair of metallic contacts 20 and 22 are integrally attached and oppositely located on external surfaces of the transmitter component 16. This first pair of metallic contacts 20 and 22 are electrically connected to the self contained battery 26 so that the battery may be recharged when desired or necessary.

Figure 4:
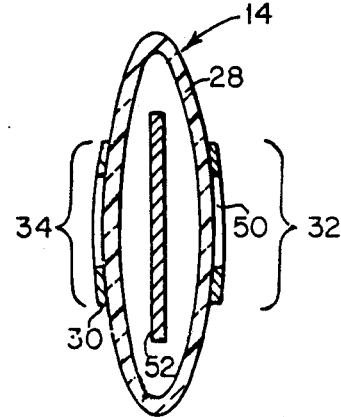
FIG. 4 is a cross sectional view taken along line 4—4 in FIG. 2 through the band assembly.

As best understood by examining FIG. 4, a transparent or translucent band assembly 14, typically but not necessarily fabricated out of a tubular flexible plastic material 28 has a generally elliptic cross sectional shape with electrically conductive material 30 adhered separate along two separate portions 32 and 34 of its outer surfaces which portions are transversely spaced apart and generally on opposite sides of band assembly 14. A piece of paper 52 or other similar material having relevant indicia can be inserted in side of the band assembly 14, and can be seen through an elongated clear area 50.

Figure 3:
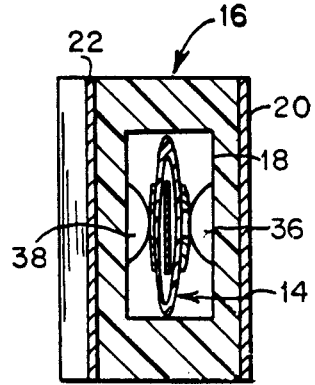
FIG. 3 is a cross sectional view taken along line 3—3 in FIG. 2 through the transmitter component.

As best seen by examining FIG. 3 this band assembly 14 is sized so as to just slide through the cavity 18 in the transmitter component 16. Mounted inside the cavity 18 of the transmitter component 16 are a second pair of electrical contacts 36 and 38 which come in to intimate contact with the electrically conductive material 30 adhered to the band assembly 14. These electrical contacts 36 and 38 are electrically connected at the ends of a series circuit with the battery 26, and RF circuitry 24, so that when these contacts are electrically connected to each other the RF circuitry is enabled and caused to transmit typically an a signature encoded signal.

Figure 5:
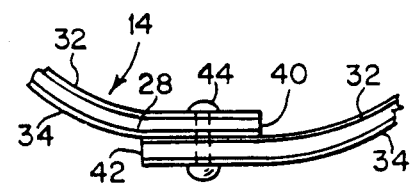
FIG. 5 is an enlarged detail view as indicated by arrow 5 in FIG. 1 of the attaching rivet for the band component.
Figure 7:
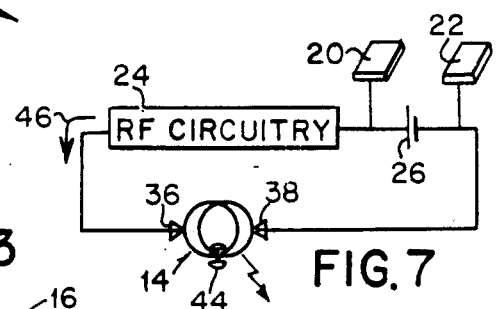
FIG. 7 is a electrical schematic diagram of the instant invention.
Figure 2:
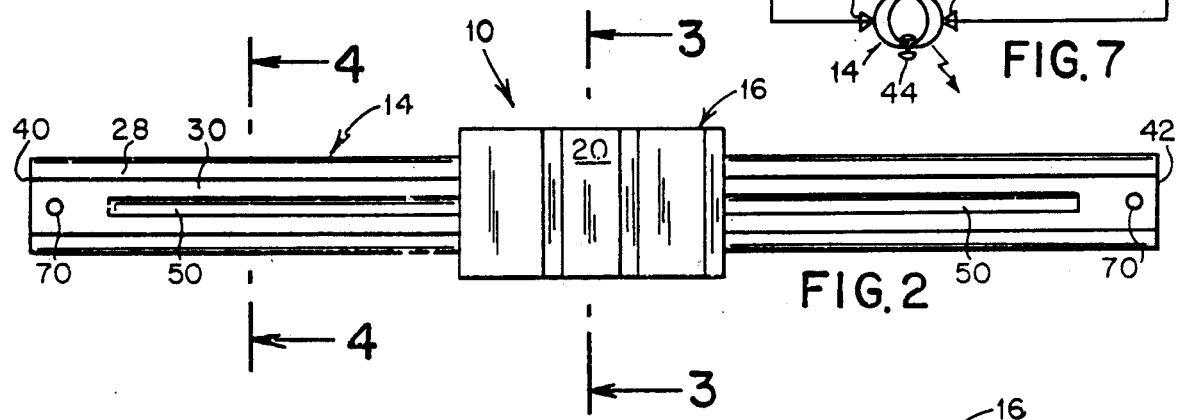
FIG. 2 is a plan view of the instant invention.

In operative use, when the device 10 is installed on either a person or equipment on which it is necessary to maintain a constant vigil about the proximity of such, the band assembly 14 with the transmitter component 16 already installed thereon is secured around either an appendage of the person, or a permanent integral part of the equipment, by joining the ends 40 and 42 of the band assembly 14 together. It is the joining of the ends 40 and 42 by a rivet 44 placed through apertures 70 near the ends 40 and 42 which completes the DC electrical circuits path 46 because the opposite sides, that is the two separate portions 32 and 34 with electrical conductive material 30, are brought together in intimate contact, as best seen in FIG. 5. The band assembly in addition to serving simultaneously as a securing device and an activating switch device, if properly designed will also act as an RF antenna so as to produce a practical and stable radiation impedance.

In a practical situation a receiver station constantly receives, identifies and monitors the signal 48 emanating from the instant invention 10. If the instant invention is taken either out of range from this station or the band assembly 14 is severed in an attempt to remove the person 12 or equipment (not illustrated) to which the band is secured the signal 48 ceases to be received at the receiver station and thus indication is given that the allowed proximity is being exceeded.

An additional peripheral component illustrated in FIG. 6 is a charging fixture 54 which has an internal keyed cavity 56 which just matches the external shape of the case 58 of the transmitter component 16. When it is necessary or desired to charge the battery 26, the entire case 58 can be inserted into the charging fixture 54 in order to bring a first pair of metallic contacts 20 and 22, respectively into intimate electrical contact with a third pair of metallic contacts 60 and 62. The charging fixture has a pair of slots 64 and 66 so as to permit the band assembly 14 to remain installed so that the instant invention can be charged even while in use if the application so requires. Power is supplied to the charging fixture typically via cable and plug assembly 68.

In alternative embodiments of the instant invention component 26 can be a solar cell rather than a battery, or a solar cell in parallel combination with battery 26 in order to permit the device the capability of remaining operational by utilizing ambient lighting conditions. In this case the need to recharge the internal battery as a separate step would be eliminated as long as the device remains in the presence of a sufficient amount of ambient light a minimal amount of time. This solar cell would be the entire surface under numeral 58, best seen in FIG. 6.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An electronic signal and alarm protection proximity device which comprises:
   (a) a transmitter component for creating an RF signal and having a rectangular section cavity that extends completely therethrough;
   (b) a band assembly for securing said transmitter component to a person or equipment and having electrically conductive material adhered along two separate portions of an outer surface thereof which separate portions are spaced apart transversely to the band's length; a pair of transmitter contacts housed within said rectangular section cavity; said electrically conductive material on said two separate portions making intimate contact with respective contacts of the pair of contacts; the two separate portions being securable in intimate contact with each other to form said band into a loop and complete a DC power circuit path through said contacts, whereby said transmitter component is activated; and,
   (c) means responsive to severing said band for disabling said transmitter.

2. An electronic signal and alarm protection proximity device, as recited in claim 1, wherein said transmitter component for creating an RF signal has a rechargeable self contained battery for powering said transmitter, and also has means for recharging said self contained battery.

3. An electronic signal and alarm protection proximity device, as recited in claim 2, wherein said means for recharging said self contained battery, is a further pair of contacts adhered to an outer case housing that houses said transmitter component and a third pair of contacts housed in a keyed cavity in a charging fixture, said cavity just matches a shape of said outer case housing, whereby when said outer case housing is inserted in said keyed cavity in said charging fixture, said further pair of contacts and said third pair of contacts will be in intimate contact with each other whereby said battery can be charged.

4. An electronic signal and alarm protection proximity device, as recited in claim 1, wherein a means for holding said two separate portions of an outer surface of said band assembly in intimate contact with each other, whereby said transmitter component is activated, is a rivet placed through appropriate apertures in said band assembly.

5. An electronic signal and alarm protection proximity device, as recited in claim 1, wherein said RF signal has a particular identifiable encoded signature so as to be distinguishable from other similar RF signals operating on a same RF frequency.

6. An electronic signal and alarm protection proximity device, as recited in claim 1, wherein said band assembly for securing said transmitter component to a person or equipment has transparent portions to allow viewing of an inserted piece of indicia paper with identifying data there on.

7. An electronic signal and alarm protection proximity device, as recited in claim 1, wherein said band comprises a tube of flexible plastic material and the separate portions to which the electrically conductive material is adhered are located, respectively, on inner and outer external circumferential surfaces of the loop.

8. An electronic signal and alarm protection proximity device, as recited in claim 1, wherein the bank is slid into the cavity of the transmitter component and the separate portions to which the electrically conductive material is adhered extend longitudinally of the band so as to maintain the intimate contact of the conductive material with the pair of contacts housed within the cavity of the transmitter throughout sliding movement of the transmitter relatively along the band.

9. An electronic signal and alarm protection proximity device, as recited in claim 7, wherein the band is slid into the cavity of the transmitter component and the separate portions to which the electrically conductive material is adhered extend longitudinally of the band so as to maintain intimate contact of the conductive material with the pair of contacts housed within the cavity of the transmitter throughout sliding movement of the transmitter relatively along the band.

* * * * *